(12) United States Patent
Fang et al.

(10) Patent No.: US 11,641,490 B2
(45) Date of Patent: *May 2, 2023

(54) GEOLOCATIONING SYSTEM AND METHOD FOR USE OF SAME

(71) Applicant: Enseo, LLC, Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/554,359

(22) Filed: Dec. 17, 2021

(65) Prior Publication Data
US 2022/0109895 A1 Apr. 7, 2022

Related U.S. Application Data

(63) Continuation-in-part of application No. 17/130,134, filed on Dec. 22, 2020, now Pat. No. 11,284,123,
(Continued)

(51) Int. Cl.
| | |
|---|---|
| *H04N 21/214* | (2011.01) |
| *H04N 21/45* | (2011.01) |
| *H04N 21/236* | (2011.01) |
| *H04N 21/422* | (2011.01) |
| *H04N 21/414* | (2011.01) |
| *G07C 1/00* | (2006.01) |
| *H04N 21/434* | (2011.01) |

(Continued)

(52) U.S. Cl.
CPC ............ *H04N 21/2143* (2013.01); *G07C 1/00* (2013.01); *H04N 21/23605* (2013.01); *H04N 21/25841* (2013.01); *H04N 21/414* (2013.01); *H04N 21/4108* (2013.01); *H04N 21/42221* (2013.01); *H04N 21/4343* (2013.01); *H04N 21/43637* (2013.01); *H04N 21/4516* (2013.01); *H04N 21/4524* (2013.01); *H04W 84/12* (2013.01)

(58) Field of Classification Search
CPC ......... H04N 21/4516; H04N 21/43637; H04N 21/2143; H04N 21/25841; H04N 21/4343; H04N 21/4524; H04N 21/4108; H04N 21/414; H04N 21/42221; H04N 21/23605; G07C 1/00; H04W 84/12
See application file for complete search history.

(56) References Cited

U.S. PATENT DOCUMENTS

| | | |
|---|---|---|
| 5,661,517 A | 8/1997 | Budow et al. |
| 5,664,174 A | 9/1997 | Agrawal et al. |

(Continued)

*Primary Examiner* — Yassin Alata
(74) *Attorney, Agent, or Firm* — Scott Griggs; Griggs Bergen LLP

(57) ABSTRACT

A geolocationing system and method for providing awareness in a multi-space environment, such as a hospitality environment or educational environment, are presented. In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to a server, which determines estimated location of the wireless-enabled personal locator device.

20 Claims, 5 Drawing Sheets

Related U.S. Application Data which is a continuation of application No. 16/731,394, filed on Dec. 31, 2019, now Pat. No. 10,873,767, which is a continuation-in-part of application No. 16/201,783, filed on Nov. 27, 2018, now Pat. No. 10,602,196, which is a continuation of application No. 15/652,622, filed on Jul. 18, 2017, now Pat. No. 10,142,662, which is a continuation of application No. 15/165,851, filed on May 26, 2016, now Pat. No. 9,712,872, which is a continuation of application No. 14/461,479, filed on Aug. 18, 2014, now Pat. No. 9,357,254.

(60) Provisional application No. 63/132,670, filed on Dec. 31, 2020, provisional application No. 62/787,412, filed on Jan. 2, 2019, provisional application No. 61/935,862, filed on Feb. 5, 2014.

(51) Int. Cl.
*H04N 21/258* (2011.01)
*H04N 21/4363* (2011.01)
*H04N 21/41* (2011.01)
*H04W 84/12* (2009.01)

(56) References Cited

U.S. PATENT DOCUMENTS

| | | |
|---|---|---|
| 5,675,788 A | 10/1997 | Husick et al. |
| 5,742,816 A | 4/1998 | Barr et al. |
| 5,842,200 A | 11/1998 | Agrawal et al. |
| 6,029,176 A | 2/2000 | Cannon |
| 6,286,005 B1 | 9/2001 | Cannon |
| 9,088,828 B2 | 7/2015 | Ogle et al. |
| 9,326,009 B2 | 4/2016 | Ogle et al. |
| 9,332,304 B2 | 5/2016 | Ogle et al. |
| 9,344,757 B2 | 5/2016 | Ogle et al. |
| 9,357,254 B2 | 5/2016 | Ogle et al. |
| 9,560,388 B2 | 1/2017 | Ogle et al. |
| 9,654,826 B2 | 5/2017 | Ogle et al. |
| 9,654,827 B2 | 5/2017 | Ogle et al. |
| 9,712,872 B2 | 7/2017 | Ogle et al. |
| 9,800,932 B2 | 10/2017 | Ogle et al. |
| 9,832,489 B2 | 11/2017 | Ogle et al. |
| 9,832,490 B2 | 11/2017 | Ogle et al. |
| 10,091,534 B2 | 10/2018 | Ogle et al. |
| 10,104,402 B2 | 10/2018 | Ogle et al. |
| 10,142,662 B2 | 11/2018 | Ogle et al. |
| 10,462,881 B1 | 10/2019 | Hammet |
| 2007/0287498 A1 | 12/2007 | Wang |
| 2011/0099575 A1 | 4/2011 | Woo et al. |
| 2013/0080542 A1 | 3/2013 | Peng |
| 2013/0086245 A1 | 4/2013 | Lu |
| 2013/0328909 A1 | 12/2013 | Pacheco et al. |
| 2013/0346564 A1 | 12/2013 | Warrick |
| 2015/0256355 A1 | 9/2015 | Pera |
| 2017/0142449 A1 | 5/2017 | Ogle et al. |
| 2017/0156076 A1 | 6/2017 | Eom |
| 2018/0077459 A1 | 3/2018 | Ogle et al. |
| 2018/0084285 A1 | 3/2018 | Ogle et al. |
| 2018/0110093 A1 | 4/2018 | Deros |
| 2018/0167228 A1 | 6/2018 | Elcock |
| 2018/0167516 A1 | 6/2018 | Warrick |
| 2018/0211666 A1 | 7/2018 | Kolavennu |
| 2018/0220476 A1 | 8/2018 | Jung |
| 2018/0249188 A1 | 8/2018 | Fang et al. |
| 2018/0270510 A1 | 9/2018 | Fang et al. |
| 2019/0037248 A1 | 1/2019 | Ogle et al. |
| 2019/0045229 A1 | 2/2019 | Ogle et al. |
| 2019/0058586 A1 | 2/2019 | Kumar |
| 2019/0098340 A1 | 3/2019 | Ogle et al. |
| 2019/0190992 A1 | 6/2019 | Warrick |
| 2019/0273749 A1 | 9/2019 | Nishimoto |
| 2019/0342112 A1 | 11/2019 | Li |
| 2019/0342942 A1 | 11/2019 | Deros |
| 2020/0037004 A1 | 1/2020 | Fang |
| 2020/0137453 A1 | 4/2020 | Fang |
| 2020/0213158 A1 | 7/2020 | Fang et al. |
| 2020/0287726 A1 | 9/2020 | Garnier et al. |

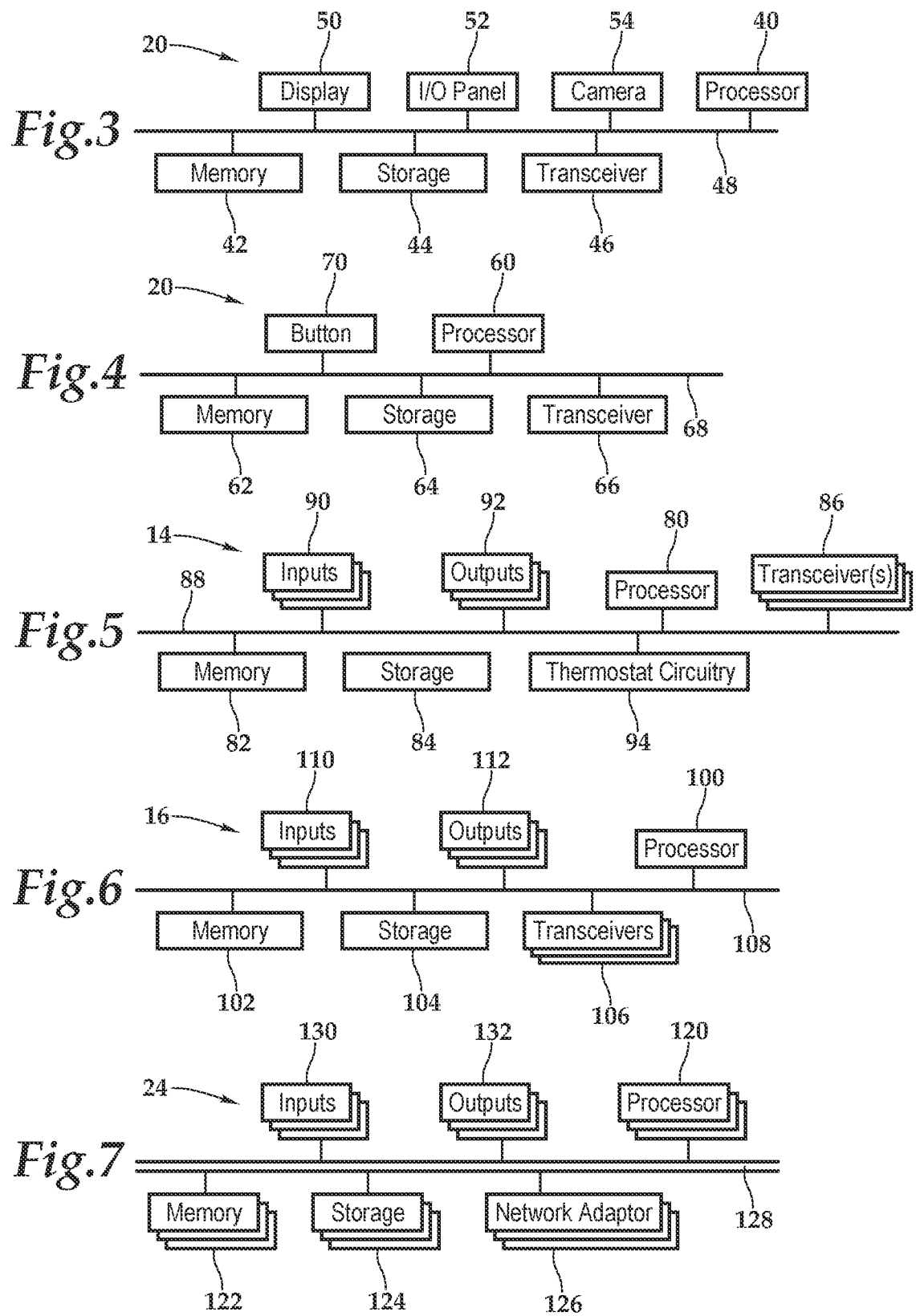

GEOLOCATIONING SYSTEM AND METHOD FOR USE OF SAME

PRIORITY STATEMENT & CROSS-REFERENCE TO RELATED APPLICATION

This application claims the benefit of U.S. Provisional Patent Application Ser. No. 63/132,670, entitled "Geolocationing System and Method for Use of Same," filed on Dec. 31, 2020, in the name of William C. Fang; which is hereby incorporated by reference, in entirety, for all purposes. This application is also a continuation in part of U.S. patent application Ser. No. 17/130,134, entitled "Geolocationing System and Method for Use of Same," filed on Dec. 22, 2020, in the names of Thomas R. Miller et al.; which is a continuation of U.S. application Ser. No. 16/731,394 entitled, "Geolocationing System and Method for Use of Same" in the names of Thomas R. Miller, et al., now U.S. Pat. No. 10,873,767 issued on Dec. 22, 2020; which claims priority from U.S. Patent Application Ser. No. 62/787,412 entitled "Geolocationing System and Method for Use of Same" filed on Jan. 2, 2019, in the name of William C. Fang; which is hereby incorporated by reference, in entirety, for all purposes. Application Ser. No. 16/731,394 is also a continuation-in-part of U.S. patent application Ser. No. 16/201,783 entitled "Set-Top Box, System and Method for Providing Awareness in a Hospitality Environment" filed on Nov. 27, 2018, in the names of Vanessa Ogle et al., now U.S. Pat. No. 10,602,196 issued on Mar. 24, 2020; which is a continuation of U.S. patent application Ser. No. 15/652,622 entitled "Set-Top Box, System and Method for Providing Awareness in a Hospitality Environment" filed on Jul. 18, 2017, in the names of Vanessa Ogle et al., now U.S. Pat. No. 10,142,662 issued on Nov. 27, 2018; which is a continuation of U.S. patent application Ser. No. 15/165,851 entitled "Set-Top Box, System and Method for Providing Awareness in a Hospitality Environment" filed on May 26, 2016, in the names of Vanessa Ogle et al., now U.S. Pat. No. 9,712,872 issued on Jul. 18, 2017; which is a continuation of U.S. patent application Ser. No. 14/461,479 entitled "Set-Top Box, System and Method for Providing Awareness in a Hospitality Environment" filed on Aug. 18, 2014, in the names of Vanessa Ogle et al., now U.S. Pat. No. 9,357,254 issued on May 31, 2016; which claims priority from U.S. Patent Application Ser. No. 61/935,862 entitled "System and Method for Providing Awareness in a Hospitality Environment" and filed on Feb. 5, 2014, in the name of Vanessa Ogle; all of which are hereby incorporated by reference, in entirety, for all purposes.

This application discloses subject matter related to the subject matter disclosed in the following commonly owned, co-pending U.S. patent application Ser. No. 17/554,282 entitled "Geolocationing System and Method for Use of Same," filed on Dec. 17, 2021, in the names of William C. Fang et al.; which is hereby incorporated by reference, in entirety, for all purposes.

TECHNICAL FIELD OF THE INVENTION

This invention relates, in general, to geolocationing and, in particular, to enhanced performance in systems and methods for providing awareness and safety in a multi-room environment such as a hospitality environment, educational environment, or the like.

BACKGROUND OF THE INVENTION

Without limiting the scope of the present invention, the background will be described in relation to employee safety in hospitality environments, as an example. Employees face increased personal security risks at work in multi-room environments such as hospitality environments, which include motels, hotels, and the like, for example. Such hospitality industry employees often work alone and range over large interior areas that may be divided into many small, closed spaces. As a result of limited existing security measures, there is a need for improved systems and methods of providing awareness and safety in hospitality environments.

SUMMARY OF THE INVENTION

It would be advantageous to achieve systems and methods for providing geolocationing in a multi-room environment such as a hospitality environment, educational environment, or the like that would improve upon existing limitations in functionality. It would be desirable to enable an electrical engineering-based and software solution that would provide enhanced awareness and safety in an easy-to-use platform in the hospitality lodging industry or in another environment. To better address one or more of these concerns, a geolocationing system and method for use of the same are disclosed.

In one embodiment of the geolocationing system, a vertical and horizontal array of gateway devices is provided. Each gateway device includes a gateway device identification providing an accurately-known fixed location within the multi-space environment. Each gateway device includes a wireless transceiver that receives a beacon signal from a proximate wireless-enabled personal locator device. The gateway devices, in turn, send gateway signals to a server, which determine estimated location of the wireless-enabled personal location. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 3 is a functional block diagram depicting one embodiment of a personal locator device depicted in FIG. 2 in further detail;

FIG. 4 is a functional block diagram depicting another embodiment of a personal locator device depicted in FIG. 2 in further detail;

FIG. 5 is a functional block diagram depicting one embodiment of a gateway device, a thermostat, presented in FIG. 1A;

FIG. 6 is a functional block diagram depicting one embodiment of a gateway device, gateway service devices, presented in FIG. 1A;

FIG. 7 is a functional block diagram depicting one embodiment of the server presented in FIG. 2;

DETAILED DESCRIPTION OF THE INVENTION

Figure 1A:
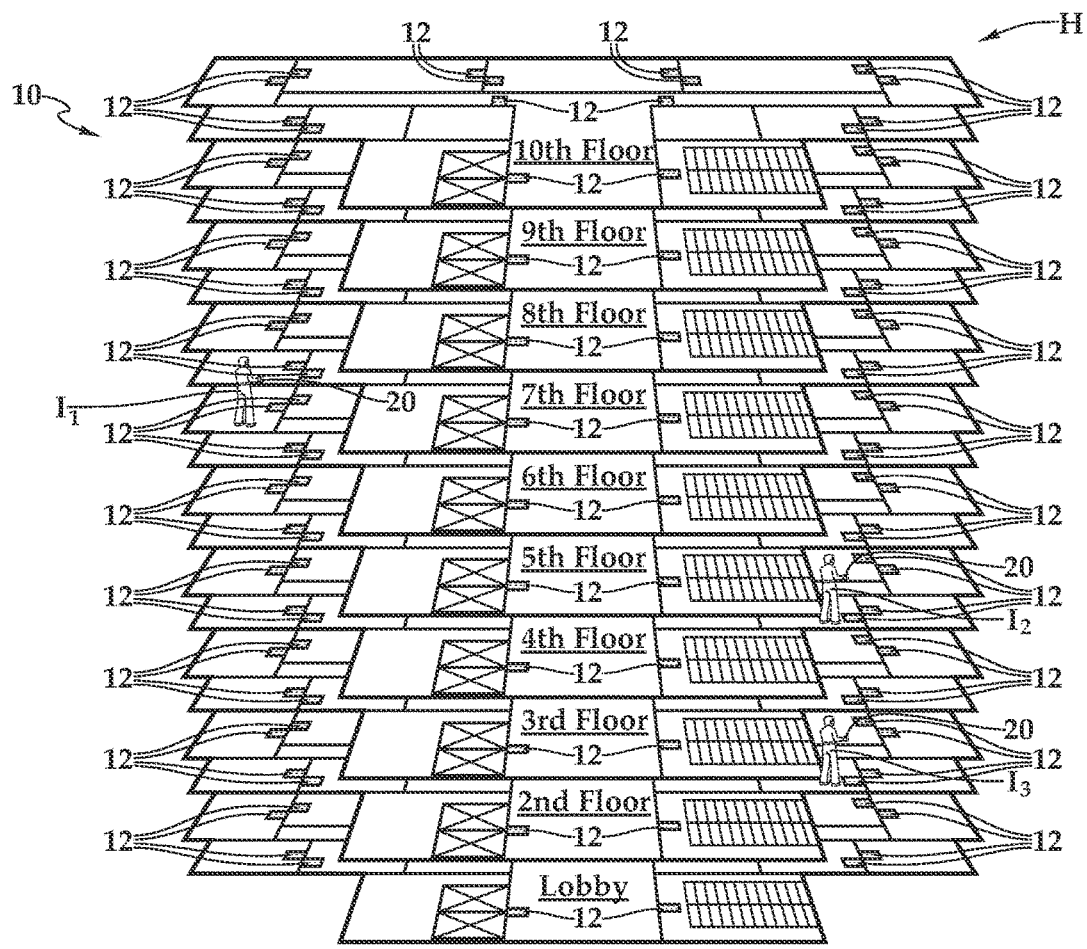
FIG. 1A is schematic building diagram depicting one embodiment of a geolocationing system for providing awareness in a multi-room environment illustrated as a hotel, according to the teachings presented herein.
Figure 1B:
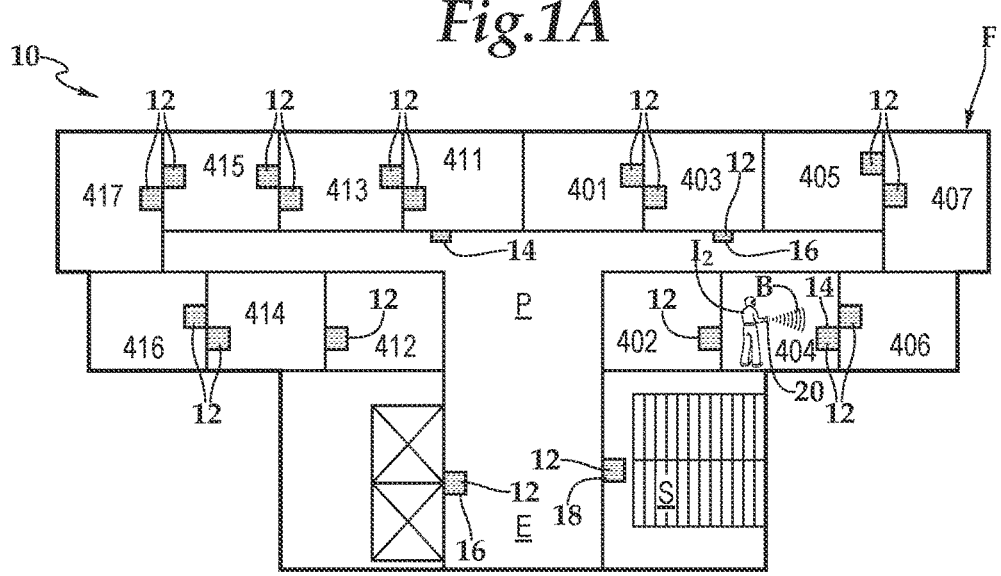
FIG. 1B is a schematic floor plan depicting a floor of the hotel presented in FIG. 1A in further detail.
Figure 1C:
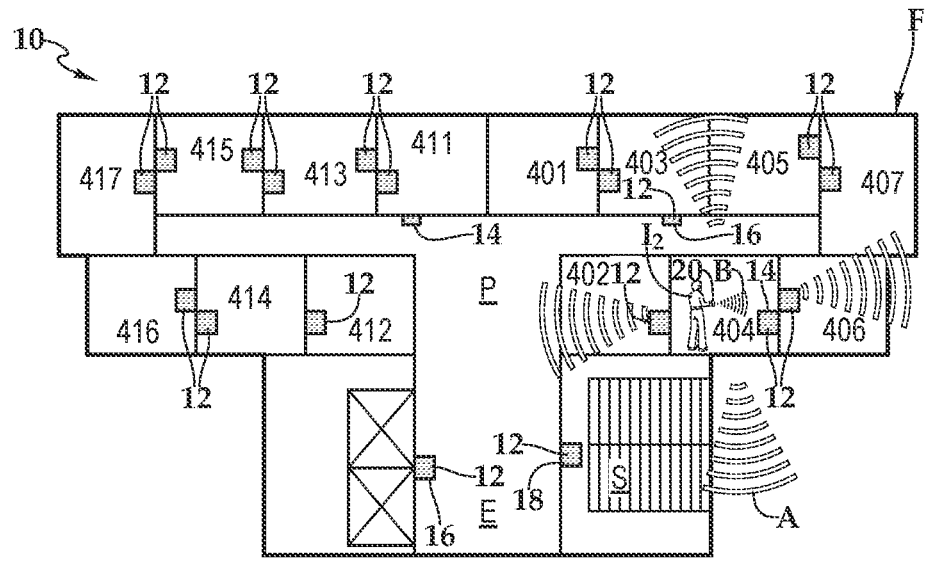
FIG. 1C is a schematic floor plan depicting a floor of the hotel presented in FIG. 1A during an alert event.
Figure 2:
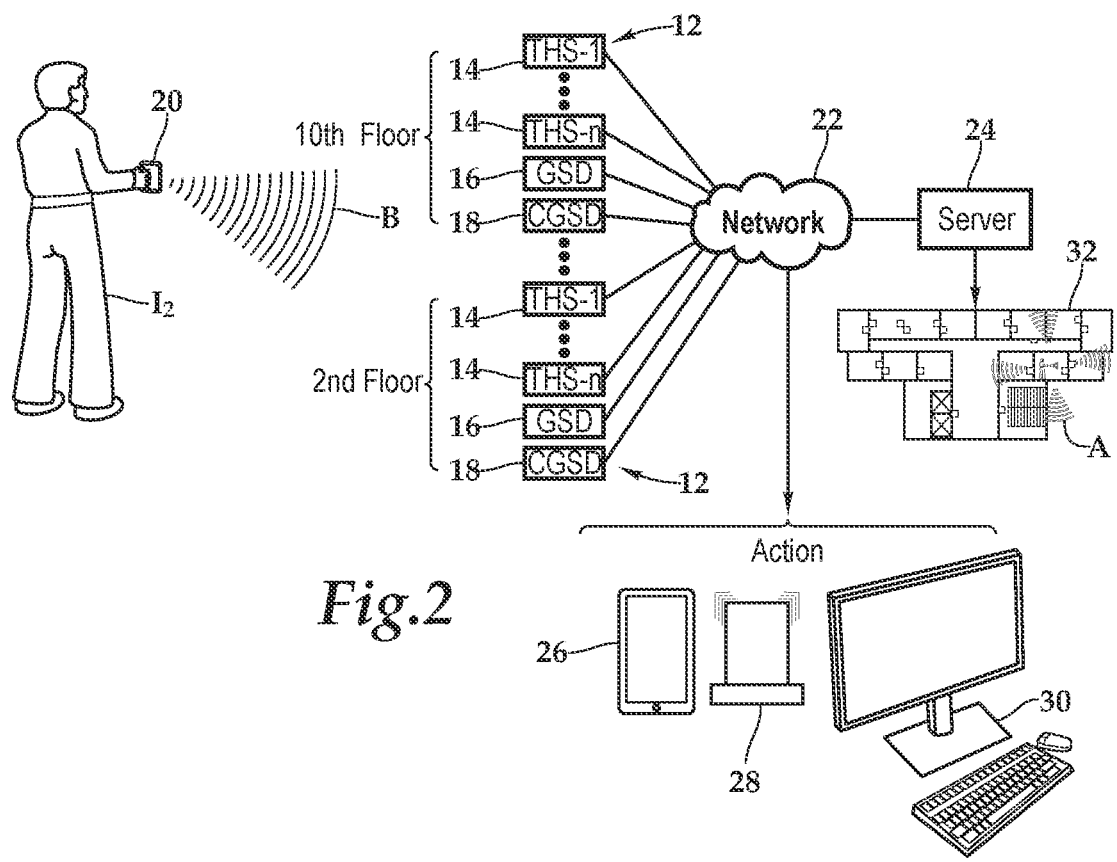
FIG. 2 is a schematic diagram depicting one embodiment of the geolocationing system presented in FIG. 1A providing enhanced awareness and safety functionality therewith according to the teachings presented herein.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIGS. 1A, 1B, 1C and 2, therein is depicted a geolocationing system for providing awareness in a multi-space environment such as a hospitality environment, which may be embodied as a furnished multi-family residence, dormitory, lodging establishment, hotel, hospital, which is schematically illustrated and designated 10. The multi-space environment may also be a multi-unit environment such as an educational environment like a school or college campus, for example. More generally, the geolocationing system 10 and the teachings presented herein are applicable to any multi-space environment including hospitality environments, educational campuses, hospital campuses, office buildings, multi-unit dwellings, sport facilities, and shopping malls, for example.

As shown, by way of example and not by way of limitation, the multi-space environment is depicted as a hotel H having a lobby and floors F, which are appropriately labeled the $2^{nd}$ floor through the 10th floor. Further, by way of example, the $4^{th}$ floor is depicted with rooms 401, 402, 403, 404, 405, 406, 407, 411, 412, 413, 414, 415, 416, 417. Additionally, a common area near the elevators is labeled E, a hallway labeled P, and a stairwell is labeled S. The lobby, the common area E, the hallway P, and the stairwell S are further illustrations of spaces in the multi-space environment in addition to the rooms 401, 402, 403, 404, 405, 406, 407, 411, 412, 413, 414, 415, 416, 417.

Gateway devices 12 are deployed as part of a horizontal and vertical array, which is generally a spatial array, throughout the hotel H. It should be appreciated, however, that the gateway devices 12, and more generally deployment of the geolocationing system 10, may include a horizontal array. Further, the deployment may be in a single story, multiple stories, or a combination thereof. As will be discussed in further detail hereinbelow, the gateway devices 12 may include thermostats 14, a gateway service device 16, or a common space gateway device 18.

Individuals, such as $I_1$, $I_2$, $I_3$, carry proximate wireless-enabled personal locator devices 20 which periodically, or on demand, transmit beacons that are received by the gateway devices 12. The proximate wireless-enabled personal locator devices 20 may be a single button personal locator device or a proximate wireless-enabled interactive programmable device, such as a smart watch, a smart phone, or a tablet computer, for example. In one embodiment, the proximate wireless-enabled interactive programmable device may be a wireless-enabled smart and interactive handheld device that may be supplied or carried by the user or guest. As shown individual $I_2$ works in the hospitality industry at hotel H and is presently working on the $4^{th}$ floor. As the individual $I_2$ is working in room 404, the proximate wireless-enabled personal locator device 20 is transmitting beacons that are received by gateway devices 12, such as the thermostat 14 that is located within the room 404 and the gateway service device 16 located in hallway P on the $4^{th}$ floor of the hotel H.

As shown, the gateway device 12 in the room 404 is the thermostat 14, which may be an information appliance device that generally monitors and controls heating and cooling in the hotel H, or a portion thereof, to a setpoint temperature, which is adjustable, through communication between the thermostat and an HVAC system. The thermostat 14 may be communicatively disposed with various amenities associated with the hotel H as well as the geolocationing system 10 providing a geolocation and safety network. The gateway device 12 in the common area near elevators E of the $4^{th}$ floor is the gateway service device 16 and the common space gateway device 18 is also in the common area near elevators E of the $4^{th}$ floor. The gateway service device 16 may be communicatively disposed with various amenities associated with the hotel H as well as the geolocationing system 10 providing the geolocation and safety network. The common space gateway device 18 may include a limited set of functionality as compared to the gateway service device 16. The limited functionality, however, includes connectivity to the geolocationing system 10 providing the geolocation and safety network. Gateway devices, like the gateway device 12, including the thermostat 14, the gateway service device 16, and the common space gateway device 18, may be deployed throughout the spaces, rooms, and other areas of the hotel H.

As mentioned, each of the gateway devices 12, including the thermostats 14, the gateway service devices 16, and the common space gateway devices 18, have a data link via a network 22 to a server 24 which is providing a geolocation and safety network. In one implementation, the individual 12 has the proximate wireless-enabled personal locator device 20, which may transmit a beacon signal B from the proximate wireless-enabled personal locator device 20 using a wireless standard, such as Wi-Fi, to the gateway devices 12. Each of the gateway devices 12, including the thermostat 14 and the gateway service device 16, then processes the received beacon signal B and sends a gateway signal to the server 24. The server 24 receives the gateway signals and uses multiple gateway signals for determining the estimated location of the proximate wireless-enabled personal locator device 20 of the individual 12. The server 24, in turn, sends out the appropriate notifications to various phones 26, activates alarms 28, or notify others via a computer 30, depending on the situation. As a spatial array of horizontal and vertical gateway devices 12 are provided, the server 24 and geolocationing system 10 presented herein is able to determine the location of the individual associated with the proximate wireless-enabled personal locator device 20 within a building. As particularly illustrated in FIGS. 1C and 2, the individual 12 is in need of emergency assistance and activates the proximate wireless-enabled personal locator device 20. In one implementation, beacon signals B are received by all nearby gateway devices 12, which in turn forward gateway signals to the server 24 for processing and determining the estimated location. The estimated location includes which floor F the individual is presently located as well as the room or common area near elevators E and the presence of a status or an alarm, such as Alarm A. In one embodiment, this information may be generated by the server 24 in the form of a map view 32, which includes a graphical representation of the multi-space environment that is annotated with the estimated location of the proximate wireless-enabled personal locator device 20.

Referring to FIG. 3, the proximate wireless-enabled personal locator device 20 may be a wireless communication device of the type including various fixed, mobile, and/or portable devices. To expand rather than limit the previous discussion of the proximate wireless-enabled interactive programmable device 20, such devices may include, but are not limited to, cellular or mobile telephones, two-way radios, personal digital assistants, digital music players, Global Positioning System units, tablet computers, smartwatches, and so forth. The proximate wireless-enabled interactive programmable device 20 may include a processor 40, memory 42, storage 44, and a transceiver 46 interconnected by a busing architecture 48 that also supports a display 50, I/O panel 52, and a camera 54. It should be appreciated that although a particular architecture is explained, other designs and layouts are within the teachings presented herein.

In operation, the teachings presented herein permit a proximate wireless-enabled interactive programmable device 20, such as a smart phone or simple transmitter, to communicate with the thermostat 14 that is able to relay an alert with location information to the server 24 and security or other individuals needing to know about the emergency. In one operational embodiment being described, the proximate wireless-enabled interactive programmable device 20 may be "paired" on a temporary basis to the thermostat 14 on a room-by-room basis, whereby the pairing changes as the hospitality employee's location changes. As shown, the proximate wireless-enabled interactive programmable device 20 includes the memory 42 accessible to the processor 40 and the memory 42 includes processor-executable instructions that, when executed, cause the processor 40 to send beacon signals B. The proximate wireless-enabled interactive programmable device 20 may on-demand or periodically transmit the beacon signal B including a data packet, the programmable device identification, as well as a mode of operation identification.

Referring to FIG. 4, with respect to the simplified proximate wireless-enabled interactive programmable device 20, a processor 60, memory 62, storage 64, and a transceiver 66 are supported by an interconnected busing architecture 68. An emergency button 70 provides the activation that triggers the alert. As shown, the proximate wireless-enabled interactive programmable device includes the memory 62 accessible to the processor 60 and the memory 62 includes processor-executable instructions that, when executed, cause the processor 60 to send beacon signals B. The proximate wireless-enabled interactive programmable device 20 may on-demand or periodically transmit the beacon signal B including a data packet having the programmable device identification as well as a mode of operation identification. In one embodiment, responsive to the activation of the emergency button 70, the proximate wireless-enabled interactive programmable device 20 immediately transmits the beacon signal B including a data packet having the programmable device identification as well as a mode of operation identification, i.e., an emergency alert.

Referring to FIG. 5, by way of example, the thermostat 14 may be a wall-mounted unit that is an informational appliance with Internet-of-things (IoT) functionality that generally contains convenience and data capabilities in addition to monitoring and controlling heating and cooling in a room or other environment to a setpoint temperature. The thermostat 14 may include a processor 80, memory 82, storage 84, and one or more transceivers 86 interconnected by a busing architecture 88 within a mounting architecture that supports inputs 90 and outputs 92. It should be understood that the processor 80, the memory 82, the storage 84, the inputs 90, and the outputs 92 may be entirely contained within a housing or a housing-dongle combination. The processor 80 may process instructions for execution within a computing device, including instructions stored in the memory 82 or in the storage 84. The memory 82 stores information within the computing device. In one implementation, the memory 82 is a volatile memory unit or units. In another implementation, the memory 82 is a non-volatile memory unit or units. Storage 84 provides capacity that is capable of providing mass storage for the thermostat 14. The various inputs 90 and outputs 92 provide connections to and from the computing device, wherein the inputs 90 are the signals or data received by the thermostat 14, and the outputs 92 are the signals or data sent from the thermostat 14. Thermostat circuitry 94 is also secured in the housing and coupled to the busing architecture 88 in order to communicate with the HVAC system to monitor and control heating and cooling to a setpoint temperature.

The one or more transceivers 86 are associated with the thermostat 14 and communicatively disposed with the busing architecture 88. The transceivers 86 may be internal, external, or a combination thereof to the housing. Further, the transceivers 86 may be a transmitter/receiver, receiver, or an antenna for example. Communication between various devices and the thermostat 14 may be enabled by a variety of wireless methodologies employed by the transceivers 86, including 802.11, 3G, 4G, Edge, WiFi, ZigBee, near field communications (NFC), Bluetooth low energy, and Bluetooth, for example. Also, infrared (IR) may be utilized.

The memory 82 and storage 84 are accessible to the processor 80 and include processor-executable instructions that, when executed, cause the processor 80 to execute a series of operations. With respect to the processor-executable instructions, the processor 80 is caused to receive and process the beacon signal B including a personal location device identification. More particularly, the processor-executable instructions cause the processor 80 to receive the beacon signal B via a wireless transceiver from the proximate wireless-enabled personal locator device 20. The processor-executable instructions then cause the processor 80 to measure received signal characteristics of the beacon signal B. The instructions may then cause the processor 80 to generate a gateway signal including the personal location device identification, a gateway device identification, and a signal characteristics indicator, including the received signal characteristics of the beacon signal B. Finally, the instructions may cause the processor 80 to send the gateway signal to the server 24.

Referring to FIG. 6, the gateway device 12 may be the gateway service device 16 that is an information appliance device that does not include television-tuner functionality and generally contains convenience and safety functionality. The gateway service device 16 includes a processor 100, memory 102, storage 104, and transceivers 106 interconnected by a busing architecture 108 within a mounting architecture that supports inputs 110 and outputs 112. The processor 100 may process instructions for execution within the computing device, including instructions stored in the memory 102 or in the storage 104. The memory 102 stores information within the computing device. In one implementation, the memory 102 is a volatile memory unit or units. In another implementation, the memory 102 is a non-volatile memory unit or units. Storage 104 provides capacity that is capable of providing mass storage for the gateway device 12. The various inputs 110 and outputs 112 provide connections to and from the computing device, wherein the inputs 110 are the signals or data received by the gateway device 12, and the outputs 112 are the signals or data sent from the gateway device 12.

One or more transceivers 106 may be associated with the gateway device 12 and communicatively disposed with the busing architecture 108. The transceivers 106 may be internal, external, or a combination thereof to the housing. Further, the transceivers 106 may be a transmitter/receiver, receiver, or an antenna for example. Communication between various amenities in the hotel room and the gateway device 12 may be enabled by a variety of wireless methodologies employed by the transceivers 106, including 802.11, 802.15, 802.15.4, 3G, 4G, Edge, Wi-Fi, ZigBee, near field communications (NFC), Bluetooth low energy, and Bluetooth, for example. Also, infrared (IR) may be utilized.

The memory 102 and storage 104 are accessible to the processor 100 and include processor-executable instructions that, when executed, cause the processor 100 to execute a series of operations. With respect to the processor-executable instructions, the processor 100 is caused to receive and process a beacon signal B including a personal location device identification. More particularly, the processor-executable instructions cause the processor 100 to receive a beacon signal B via the wireless transceiver from a proximate wireless-enabled personal locator device 20. The processor-executable instructions then cause the processor 100 to measure a received signal characteristic of the beacon signal B. The instructions may then cause the processor 100 to generate a gateway signal including the personal location device identification, a gateway device identification, and signal characteristics indicator. Finally, the instructions may cause the processor 100 to send the gateway signal to the server 24.

Referring now to FIG. 7, one embodiment of the server 24 as a computing device includes a processor 120, memory 122, storage 124, and one or more network adapters 126 interconnected with various buses 128 in a common or distributed, for example, mounting architecture, that supports inputs 130 and support outputs 132. In other implementations, in the computing device, multiple processors and/or multiple buses may be used, as appropriate, along with multiple memories and types of memory, as well as multiple storages and types of storage. Further still, in other implementations, multiple computing devices may be provided and operations distributed therebetween. The processor 120 may process instructions for execution within the server 24, including instructions stored in the memory 122 or in storage 124. The memory 122 stores information within the computing device. In one implementation, the memory 122 is a volatile memory unit or units. In another implementation, the memory 122 is a non-volatile memory unit or units. Storage 124 includes capacity that is capable of providing mass storage for the server 24. The various inputs 130 and outputs 132 provide connections to and from the server 24, wherein the inputs 130 are the signals or data received by the server 24, and the outputs 132 are the signals or data sent from the server 24. The network adaptor 126 couples the server 24 to a network such that the server 24 may be part of a network of computers, a local area network (LAN), a wide area network (WAN), an intranet, a network of networks, or the Internet, for example.

The memory 122 and storage 124 are accessible to the processor 120 and include processor-executable instructions that, when executed, cause the processor 120 to execute a series of operations. In one embodiment of processor-executable instructions, the processor-executable instructions cause the processor 120 to receive a plurality of gateway signals from a plurality of gateway devices of the vertical and horizontal array. The processor 120 is caused to process the plurality of gateway signals and determine estimated location of the proximate wireless-enabled personal locator device 20. The processor 120 may also be caused to annotate the graphical representation of the multi-space environment with location of the proximate wireless-enabled personal locator device 20, and annotate the graphical representation of the room with the alert notification.

Figure 8A:
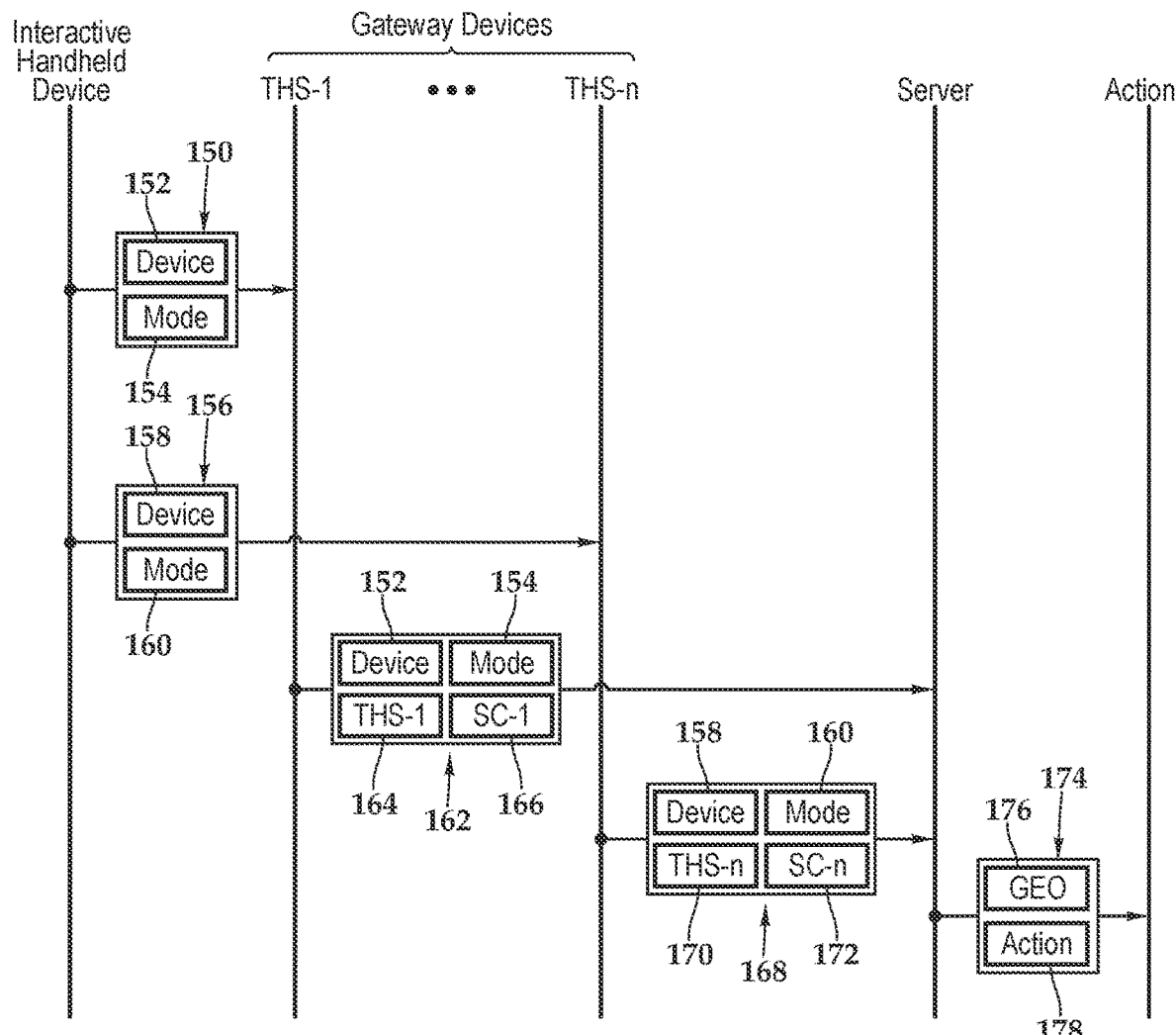
FIG. 8A is a data processing diagram depicting one embodiment of the geolocationing system according to the teachings presented herein.

FIG. 8A illustrates one embodiment of signalization and data transfer. As shown, an interactive handheld device transmits data packet 150, which is a beacon signal B, including a device indicator 152 and a mode of operation indicator 154. The interactive handheld device also transmits data packet 156, which is a beacon signal B, including a device indicator 158 and a mode of operation indicator 160. The data packets 150, 156 are received by gateway devices; namely, thermostat THS-1 and thermostat THS-n. The gateway device THS-1 then establishes data packet 162, including the device indicator 152, the mode of operation indicator 154, gateway device identification 164 (THS-1), and signal characteristic 166 (SC-1). Similarly, the gateway device THS-n then establishes data packet 168, including the device indicator 158, the mode of operation indicator 160, a gateway device identification 170 (THS-n), and a signal characteristic 172 (SC-n).

The data packets 162, 168, which are gateway signals, are transmitted to the server 24 and the server 24 analyzes the data packets 162, 168 and determines the estimated location of the proximate wireless-enabled interactive programmable device 20. The server 24 then sends out signal 174, which includes the estimated geolocation 176 and the appropriate action 178.

Figure 8B:
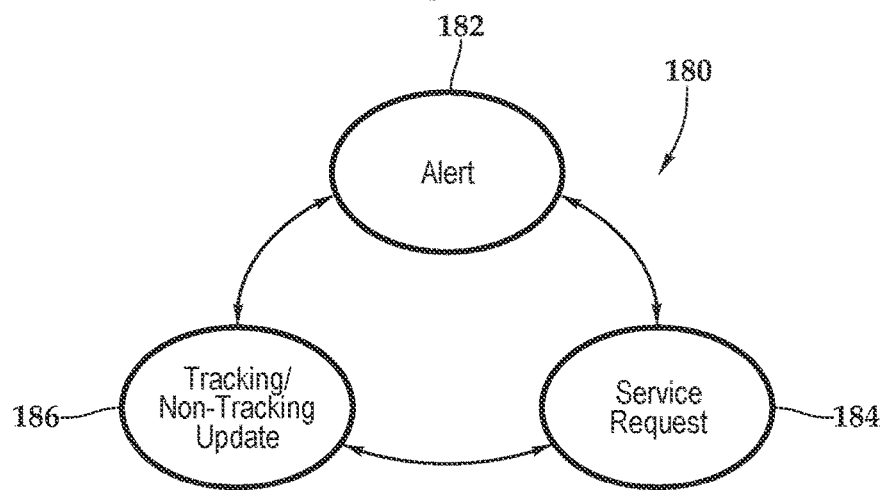
FIG. 8B is a state diagram depicting one embodiment of the geolocationing system presented in FIG. 8A.

FIG. 8B depicts one embodiment of a state diagram 180 of the states of the geolocationing system 10, which include an alert mode of operation 182, a service request mode of operation 184, and a tracking/non-tracking update mode of operation 186. As will be appreciated, the modes of operation may overlap or, to a partial or full extent be combined. In the alert mode of operation 182, a user of a proximate wireless-enabled interactive programmable device 20 may send an alert to indicate distress. In the service request mode of operation 184, the user may send a service along with the location information. The tracking/non-tracking update mode 186 indicates the level of privacy the user expects and how much of the location history will be saved.

Figure 9:
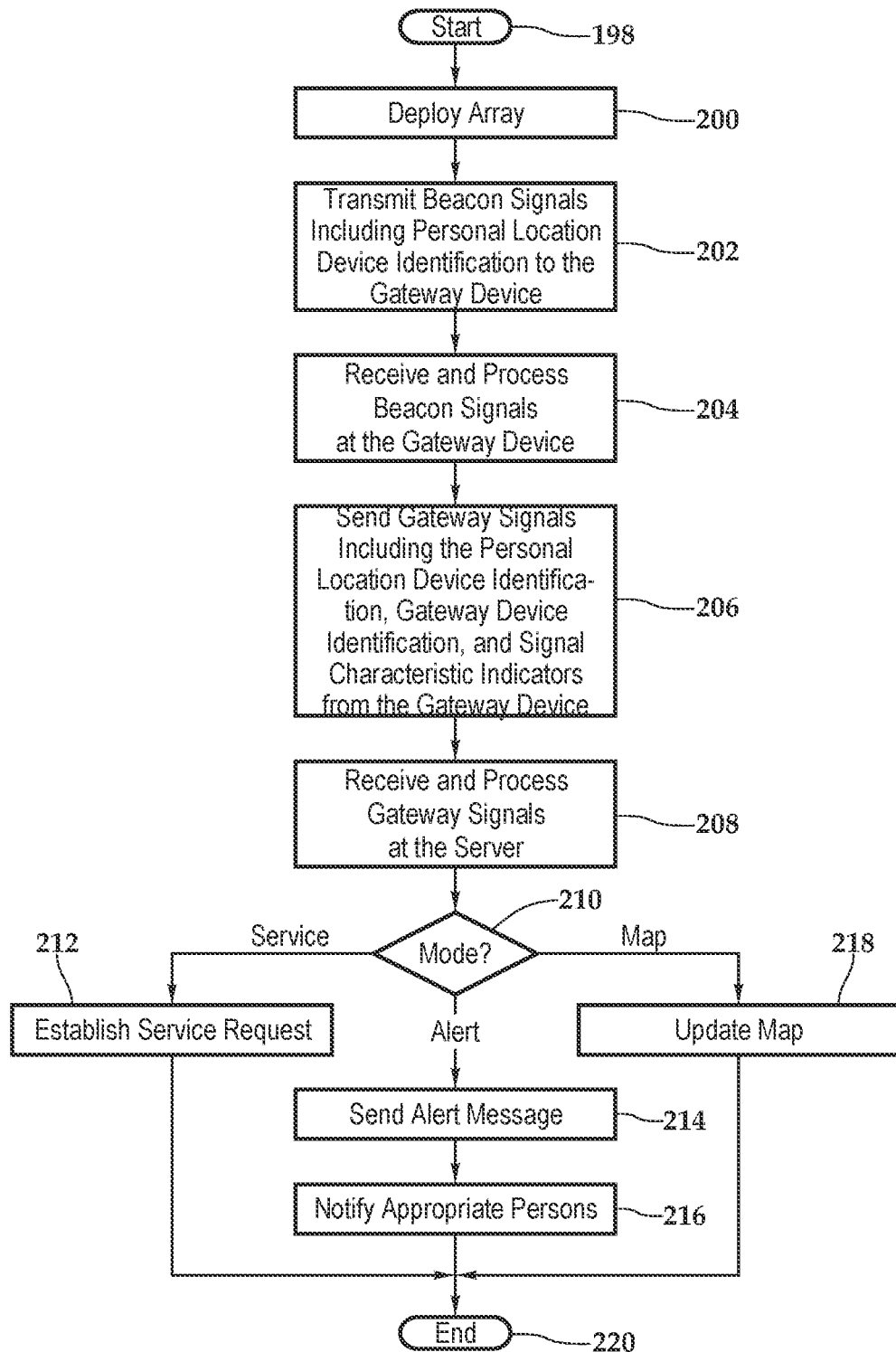
FIG. 9 is a flow chart depicting one embodiment of a method for providing a gateway device furnishing enhanced safety according to the teachings presented herein.

FIG. 9 depicts one embodiment of a method for providing safety in a hospitality environment or other environment, according to the teachings presented herein. The methodology starts at block 218, where it progresses through block 200, where an array of gateway devices is deployed vertically and horizontally throughout the hospitality environment. At block 202, beacon signals are periodically transmitted from personal location devices and received by the gateway devices.

At block 204, the beacon signals are received and processed at the gateway device. The beacon signals may include a personal location device identification corresponding to the device being employed by a user. In one embodiment, signal strength between the beacon transmission of the thermostats and the common area beacons at the proximate wireless-enabled interactive programmable device is measured. In other embodiments, phase angle measurements or flight time measurements may be utilized. At block 206, broadcast signals are sent from the gateway devices to a server that is part of the geolocation and safety network. The broadcast signals may include the personal location device identification, gateway device identification, and signal characteristic indicators. At block 208, the server receives and processes the broadcast signals to determine an estimated location. At decision block 210, the server takes action based on the mode of operation. In a first mode of operation at block 212, a service request is associated with the location of the user utilizing the location of the proximate wireless-enabled personal locator device such as the proximate wireless-enabled interactive programmable device as a proxy prior to block 220, the methodology ending. In a second mode of operation at block 214, an emergency alert is sent and appropriate, subsequent notification occurs at block 216 prior to the block 220. The emergency alert includes an indication of distress and the location of the user utilizing the location of the proximate wireless-enabled interactive programmable device as a proxy. In a third mode of operation at block 218, the map of an individual is updated with the location of the user with, if privacy settings being enabled, the system maintains the privacy of the individual working in the hospitality environment such that the system only retains in memory the last known position and time of the user-supplied proximate wireless-enabled interactive programmable device prior to the block 220. Further, in this mode of operation, the system does not reveal the location of the individual and programmable device unless and until an alert is issued.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for providing awareness in a multi-space environment, the system comprising:
an array of gateway devices, each gateway device being positioned within a space in the multi-space environment, each gateway device having a gateway device identification providing an accurately-known fixed location;
each gateway device of the vertical and horizontal array including:
a housing,
a wireless transceiver associated with the housing,
a processor located within the housing and coupled to the wireless transceiver,
memory accessible to the processor, the memory including processor-executable instructions that, when executed, cause the processor to:
receive a beacon signal via the wireless transceiver from a proximate wireless-enabled personal locator device, the beacon signal including a personal locator device identification,
transmit a gateway signal to a server, the gateway signal including the personal locator device identification and the gateway device identification.

2. The system as recited in claim 1, wherein the wireless transceiver is configured to communicate with a standard selected from the group consisting of infrared (IR), 802.11, 3G, 4G, Edge, WiFi, ZigBee, near field communications (NFC), Bluetooth and Bluetooth low energy.

3. The system as recited in claim 1, wherein the gateway device further comprises a plurality of wireless transceivers.

4. The system as recited in claim 1, wherein the gateway device further comprises a thermostat.

5. The system as recited in claim 1, wherein the gateway device further comprises a thermostat, the thermostat having thermostat circuitry to monitor and control heating and cooling to a setpoint temperature.

6. The system as recited in claim 1, wherein the gateway device further comprises a common space gateway device.

7. The system as recited in claim 1, wherein the gateway device further comprises a gateway service device.

8. The system as recited in claim 1, wherein the proximate wireless-enabled personal locator device further comprises a single button personal locator device.

9. The system as recited in claim 1, wherein the proximate wireless-enabled personal locator device further comprises a proximate wireless-enabled interactive programmable device.

10. The system as recited in claim 9, wherein the proximate wireless-enabled interactive programmable device further comprises a device selected from the group consisting of smart watches, smart phones, and tablet computers.

11. The system as recited in claim 1, wherein the server further comprises a back-office hotel server in communication with the array of gateway devices.

12. The system as recited in claim 1, wherein the server further comprises a cloud-based server in communication with the array of gateway devices.

13. The system as recited in claim 1, wherein the gateway signal further comprises a received signal strength measurement.

14. The system as recited claim 1, wherein the system further comprises an operational mode selected from the group consisting of alerts-enabled, service request-enabled, tracking-enabled, and non-tracking-enabled.

15. The system as recited in claim 14, wherein in the alerts-enabled mode, the server receives a distress signal from the proximate wireless-enabled personal locator device.

16. The system as recited in claim 14, wherein in the service-request-enabled mode, the server receives a service request from the proximate wireless-enabled personal locator device.

17. The system as recited in claim 14, wherein in the tracking-enabled mode, the server maintains in memory a plurality of estimated locations with timestamps associated with the proximate wireless-enabled personal locator device.

18. The system as recited in claim 14, wherein in the non-tracking-enabled mode, the server maintains in memory only the last known locations with timestamps associated with the proximate wireless-enabled personal locator device.

19. A system for providing awareness in a multi-space environment, the system comprising:
- an array of gateway devices, each gateway device being positioned within a space in the multi-space environment, each gateway device having a gateway device identification providing an accurately-known fixed location;
- a portion of the array of gateway devices being thermostats, each thermostat having thermostat circuitry to monitor and control heating and cooling to a setpoint temperature;
- each gateway device of the array of gateway devices including:
  - a housing,
  - a wireless transceiver associated with the housing,
  - a first processor located within the housing and coupled to the wireless transceiver,
  - a first memory accessible to the processor, the memory including processor-executable instructions that, when executed, cause the processor to:
    - receive a beacon signal via the wireless transceiver from a proximate wireless-enabled personal locator device, the beacon signal including a personal locator device identification,
    - transmit a gateway signal to a server, the gateway signal including the personal locator device identification, the gateway device identification, and received signal strength measurement; and
- the server located in communication with the vertical and horizontal array of gateway devices, the server including:
  - a second processor, and
  - a second memory accessible to the processor, the memory including processor-executable instructions that, when executed, cause the processor to:
    - receive a plurality of gateway signals from a plurality of gateway devices of the array of gateway devices,
    - process the plurality of gateway signals, and
    - determine estimated location of the proximate wireless-enabled personal locator device.

20. A system for providing awareness in a multi-space environment, the system comprising:
- an array of gateway devices, each gateway device being positioned within a space in the multi-space environment, each gateway device having a gateway device identification providing an accurately-known fixed location;
- a portion of the array of gateway devices being thermostats, each thermostat having thermostat circuitry to monitor and control heating and cooling to a setpoint temperature;
- each gateway device of the vertical and horizontal array including:
  - a housing,
  - a wireless transceiver associated with the housing,
  - a first processor located within the housing and coupled to the wireless transceiver,
  - a first memory accessible to the processor, the memory including processor-executable instructions that, when executed, cause the processor to:
    - receive a beacon signal via the wireless transceiver from a proximate wireless-enabled personal locator device, the beacon signal including a personal locator device identification,
    - transmit a gateway signal to a server, the gateway signal including the personal locator device identification, the gateway device identification, and received signal strength measurement; and
- the server located in communication with the array of gateway devices, the server including:
  - a second processor, and
  - a second memory accessible to the processor, the memory including processor-executable instructions that, when executed, cause the processor to:
    - receive a plurality of gateway signals from a plurality of gateway devices of the array of gateway devices,
    - process the plurality of gateway signals,
    - determine estimated location of the proximate wireless-enabled personal locator device,
    - activate an alert notification,
    - render a map view of the multi-space environment, the map view including a graphical representation of the multi-space environment,
    - annotate the graphical representation of the multi-space environment with location of the proximate wireless-enabled personal locator device, and
    - annotate the graphical representation of the room with the alert notification.

* * * * *